2,871,139

SILVERING PROCESS AND MATERIALS

Samuel Wein, Quincy, Mass.

No Drawing. Application December 8, 1955
Serial No. 551,959

9 Claims. (Cl. 117—35)

The present invention presents a new silvering system involving a silvering solution which is prepared entirely from dry solid crystalline materials (which are much more cheaply shipped to the user than complete solution), dissolved in water, in which solution the silver is sequestered by the use of appropriate chelating agents which maintain the silver in satisfactory solution, until the reducing agent is added, and then cause precipitation of the silver in smooth non-crystalline form, only upon an adjacent solid surface (which may be any solid water insoluble substance) rather than in the body of the solution as so often happens with prior solutions.

In the prior art of depositing silver upon non-metallic objects, such as the silvering of glass for the production of mirrors, it has been customary to use a suitable amount of ammonia in the silver solution which first precipitates the silver and then redissolves it, serving as a means for keeping the silver in solution temporarily, until it can be reduced to metal by the use of some reducing agent such as sugar. However these prior solutions are extremely difficult and unpleasant to use, in part because of the difficulty of getting all of the conditions just right, and frequently the silver precipitates in the body of the solution, rather than upon the surface to be silvered, and in part because of the objectionable odors of ammonia and formaldehyde. Furthermore many of the substances required for the older silvering procedures were liquids, of unstable composition and questionable strength, making it extremely difficult to weigh and measure out the necessary components with the result that the silvering of mirrors and the like, is an art requiring very great skill and experience on the part of the operator.

The present invention provides a silvering process, in which no ammonia is used, but in which all of the substances used are solids which are stable, not subject to change upon standing, and easily weighed out in appropriate proportions. It has been considered that silver was not subject to complexing or chelating; I have found however that with selected agents, these reactions do occur, and the silver is held in the prepared solution in a much better form, subject to precipitation substantially only upon a solid surface, upon the addition of an appropriate reducing agent.

In practicing the invention, the surface to be silvered is first carefully cleaned, then sensitized, then the complexed or chelated silver, in solution in water, is mixed with an appropriate reducing agent, and the whole then applied to the surface to be silvered. This procedure has the very great advantage of efficient use of the silver, simplicity of preparation of the silvering mixture, and freedom from troubles during the silvering reaction. Other objects and details of the invention will be apparent from the following description:

In practicing the invention, it is essential that the surface to be silvered, be carefully cleaned. This is preferably done by a treatment first with a caustic alkali solution, or a nitric acid solution, to remove, as much as possible, all of the grease. A very light fine non-scratching polishing substance may be used, such as powdered silica of 325 mesh. Alternatively jeweler's rouge, slightly moistened, may then be rubbed on the surface and then rinsed off. This is also very good. Care must however be taken to avoid any scratches whatever in the surface to be silvered when a mirror is to be made. When the surface is well cleaned, as with caustic or rouge, it is desirably scrubbed with a dilute nitric acid solution to complete the cleaning, and then rinsed with distilled water.

The surface to be silvered is then desirably "sensitized." This is desirably done with a tin compound, and in the past, it has been considered that only a dilute stannic chloride solution, in the strength of about 1% to 5%, is effective. However, such a solution tends strongly to hydrolyze, very greatly reducing the effectiveness of the solution as a sensitizing medium. Accordingly, it is the accepted practice to add to such aqueous tin chloride solutions sufficient hydrochloric acid to prevent the hydrolysis referred to.

According to the present invention I have now found that a number of solid, readily weighable acidic organic bodies are excellent substitutes for the hydrochloric acid. Representative substances are sulfamic acid, or betaine hydrochloride, or glutamic acid hydrochloride. These substances are all dry non hygroscopic solids, which may be mixed with an appropriate amount of stannic chloride in the dry state, and kept for indefinite lengths of time. There appears to be no reaction in any length of time between the tin hydrochloride and any of these substances. Thus the sensitizing solution may be prepared by adding roughly equal parts of tin chloride and the suggested hydrolysis preventing agent, to an appropriate amount of water to yield a concentration of each of approximately 1% but not exceeding 5%. Thus the dry solid tin chloride and the retarding compound or hydrolysis preventing compound either of which terms may be applied, may be packaged together in an amount sufficient to make a required quantity of the sensitizing solution and they will keep indefinitely, ready for use merely upon the adidtion of the solids to the appropriate amount of water and stirring until they are dissolved, whereupon the sensitizing solution is ready for use, to provide a much more efficient, effective and satisfactory sensitized surface.

The sensitizing requires only a few minutes immersion in the sensitizing solution, whereupon the solution may be poured off and the surface is ready for the silvering operation, although it usually is desirable to rinse the surface briefly with tap water.

When the surface to be silvered has been properly sensitized and drained, it is ready for the silvering operation per se. For this purpose a solution of silver nitrate is preferably used, although other water soluble silver compounds are usable.

As in the case of the sensitizing solution, the silver solution is prepared from a mixture of dry, non-hygroscopic, solids which may be packaged in quantities sufficient to make an appropriate amount of ready solution, such as a gallon or a liter or the like. For the silvering solution, an appropriate amount of the silver nitrate is weighed out and packaged as such with the instructions on the package as to the quantity of water in which it is to be dissolved. Simultaneously an appropriate package of sequestering or chelating substance with a reducing agent may be prepared. Such compounds as Tris (hydroxymethyl) aminomethane are particularly suitable. Another typical compound is 2-amino-2-methyl-1,3-propanediol. With these compounds, it is usually desirable to add a reasonable strong alkali, preferably not caustic, because of its hygroscopic character and the difficulty of weighing out, but a substantial quantity of sodium carbonate is suitable. Most of these compounds have a fairly high pH and the addition of a reasonable amount of sodium or potassium carbonate will raise the pH still higher. It is found that the pH in the neighborhood of 11 is very desirable in the silvering reaction, since it improves and speeds up the silvering reaction and facilitates the solution of the other components.

Thus for the silvering reaction there are provided two packages of dry, solid, non-hygroscopic, substances, which desirably are separately dissolved and then mixed, one package containing the silver nitrate or other silver salt, the other package containing the complexer or chelating agent, an alkali, and a reducing agent. The reducing agent likewise may be any one, or more, of a wide range of reducing agents, hydrazine sulphate being the preferred substance and representative of a wide range of other reducing agents such as paraformaldehyde, and the like. When the two packages of solids have been dissolved in the appropriate amounts of water, the solutions are mixed, and applied to the sensitized surface which has been prepared for silvering. The reaction begins with reasonable promptness and continues at a good rate of speed, the reduction apparently occurring only on the solid surface, and a minimum of colloidal metallic silver being produced in the solution, thereby conserving very greatly the quantity of silver.

When a sufficient layer of silver has been obtained, the silvering solution may be poured off and the silvered surface rinsed. The relatively leisurely rate at which this silvering reaction occurs, makes it particularly advantageous for the production of "half-silvered surfaces" such as the photographer or optician so often wants and the excellent degree of control by adjustment of the solution concentrations is a very valuable portion of the present invention. This reaction is also very valuable for the preparation of any electrically non-conducting surface for the subsequent application of coats of electroplate.

Thus the invention consists in part of a new group of compositions of matter suitable for the preparation of silvering materials, in which the entire group of contained substances are dry solids suitable for weighing out and indefinite storage in admixture. A further portion of the invention is to be found in the improvements above disclosed in the sensitizing solution, and a still further portion of the invention is found in the improvements above disclosed in the sensitizing solution, and a still further portion of the invention is found in the chelating or complexing of the silver to control the precipitating reaction, and to permit of the use of the wide range of other reducing agents.

The invention is particularly well shown in the following examples:

Example 1

In practicing the invention for the production of a layer of silver upon a non-metallic surface such as glass, porcelain, synthetic resin, or the like, the surface is first prepared by a careful cleaning with an alkaline solution, plus rouge or silica if needed. When the foreign matter, finger marks, and the like are all removed from the surface to be silvered, it is rinsed off with a dilute nitric acid; a 5 to 10% solution being satisfactory. When the nitric acid rinse has had a few minutes to carry out the cleaning reaction, it is rinsed off several times, if convenient, to remove the nitric acid.

When this cleaning is complete, the surface is next sensitized. For this purpose there is first prepared a package containing an appropriate amount of tin chloride and the acidic agent which may be in the form of an organic type acid or may be other types of solid acidic substance. For instance a package may be prepared containing 10 to 20 grams of tin chloride and 10 to 20 grams of the acid such as sulfamic acid. This is readily packed in a convenient container made of either paper, or cardboard, or plastic or other material and when so packaged it will keep indefinitely. For use, this package is opened and the contents dissolved in a proper amount such as one gallon of water. The surface to be silvered is then treated with this mixture, in solution, as the sensitizing agent. It is to be observed that the tin chloride is primarily the sensitizing agent but the acid serves as a retarder which improves the sensitizing action and at the same time prevents hydrolysis of tin chloride, maintaining the whole of the material in a clear solution. When the sensitizing solution has had a few seconds to function, it may be rinsed off and the surface again rinsed briefly with water.

Meanwhile two packages of solid salts have been prepared, one consisting of 28 grams of silver nitrate, and the other consisting of Tris (tris(hydroxymethyl)aminomethane) 95 grams, Amp (2 amino-2-methyl-1, propanol, Commercial Solvents Corp.) 9½ grams and hydrazine sulphate 14 grams. At a convenient time prior to use, each of these packages is opened and each is dissolved in one gallon of water. It will be noted that one solution consists of silver nitrate only, the other solution consists of hydrazine sulphate as the reducing agent, and the Tris and Amp as the chelating and complexing agents. To this composition there may be added, if desired, an appropriate amount of sodium carbonate ranging from 5 grams to 35 grams as desired. It will be noted that the mixture as originally prepared is fairly alkaline with a pH in the neighborhood of 10 or 12 when the sodium carbonate is added. However for optimum service, it may be desirable that the pH be still higher, and additional sodium carbonate may be added to raise the pH still higher. When both packages of solids are well dissolved in their respective gallons of water, they may be mixed, stirred to get a thorough incorporation of one into the other, and the mixture poured immediately, onto the sensitized surface. It may be observed that it does not matter whether this surface is horizontal, vertical or on the under side, the precipitation of the silver in a dense hard coherent film occurs promptly and effectively in any event. The solution may be allowed to remain on the object to be silvered until the desired thickness of silver is obtained. This may range from barely enough to give a half absorbtion half transmission, to a layer of sufficient thickness as desired, although the thicker layers tend to become crystalline at the surface and are less satisfactory. When the desired thickness of silver has been obtained, the silvering solution may be rinsed off. The silvered surface is then allowed to dry, whereupon it may be given a layer of an appropriate protective paint which may be an asphalt, shellac, or other type of lacquer or paint as desired.

By this procedure there is thus obtained an excellent silver surface, with a minimum of trouble and uncertainty.

This surface is particularly desirable for the electrodeposition of the other metals. If a particularly heavy layer is desired, it may be obtained by electroplating other metals, especially copper upon the surface, or a still thicker layer of silver may be obtained by electrodeposition of silver from a standard plating bath. The silver is readily deposited in ornamental designs, by the simple procedure of protecting the unsilvered portion of the surfaces with some convenient resist which may be a suitable film of lacquer, asphalt or other material. It may be observed that this silvering takes place equally well on a ground glass or etched or sand blasted glass surface to its precipitation on polished glass. Similarly it precipitates equally well in a dense coherent film on glazed china and it precipitates satisfactorily on such substances as Bakelite and the other synthetic resins or on wax as in the electrotyping process. By this procedure, it becomes possible to avoid the very troublesome graphiting of electrotype matrices, since the silver precipitates very quickly easily and satisfactorily upon the wax master and an excellent reproduction is obtained which may be plated with copper in the usual way. Similarly it is very convenient for use in the making of phonograph record reproductions, since the original cutting may be silvered then plated with copper to the desired thickness, the mother plating made therefrom and the stampers made from the mother by a similar silvering and electroplating process.

*Example 2*

Another embodiment of the invention uses as the sensitizing agent a mixture of 20 grams of tin chloride and 15 grams of betaine hydrochloride, dissolved in a gallon of water. The surface to be silvered is cleaned as in Example 1, rinsed, and the sensitizer applied after preparation as above indicated. The sensitizer is then poured off, the surface rinsed and a silvering solution made up of:

| | |
|---|---|
| Silver nitrate | grams__ 28 |
| Sulfamic acid | do____ 18 |
| Water | gallons__ 1 |

To this there is then added:

| | |
|---|---|
| Amp | grams__ 19 |
| Mixed amino acids (Sta-mino B) | do____ 15 |
| Sodium carbonate | do____ 34 |
| Hydrazine sulfate | do____ 12 |
| Water | gallons__ 1 |

These substances are all non-hygroscopic solids which may be packaged in a very simple package, stored until needed and then quickly dissolved in water as above indicated. When the respective solutions are completed, they are poured together, stirred and poured onto the sensitized surface. This procedure yields an equally satisfactory silver layer which serves as an excellent mirror and as an excellent foundation for the application of other metals by electrodeposition, which original film may be applied to almost any solid surface, since the solutions are highly resistant to interference by minor quantities of impurities.

A preferred form of the mixed amino acids is "Sta-mino B" made by the A. E. Staley Mfg. Co. of Decatur, Ill. and stated to consist of:

| | Percent |
|---|---|
| Leucine | 88 |
| Methionine | 8 |
| Phenylalanine | 3 |
| Thyrosine | Trace |

The exact composition is unimportant and the presence of minor impurities is not harmful.

It may be noted that in either of the above examples, the application of the silvering solution is given as being poured on. This however is not necessary, since the silvering solution may be sprayed on by any desired type of spray device, or the article to be silvered may be simply dipped into the solution as is most convenient for the operator.

*Example 3*

A similar procedure and with similar mixtures may be conducted substituting sodium bicarbonate for the sodium carbonate. Alternatively, and if a very high pH is desired, solid sodium hydroxide may be substituted for the sodium carbonate, or in some instances trisodium phosphate may be used with excellent results.

*Example 4*

It may be noted that practically any of the amino hydroxy compounds recently marketed by the Commercial Solvents Corporation including:

2-amino-1-butanol 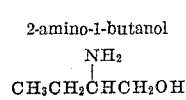

2-amino-2-methyl-1-propanol 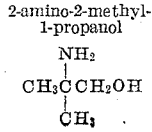

2-amino-2-methyl-1,3-propanediol  2-amino-2-ethyl-1,3-propanediol

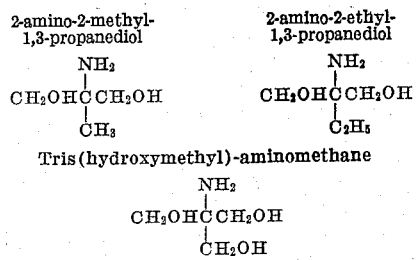

Tris(hydroxymethyl)-aminomethane $$\underset{\underset{CH_2OH}{|}}{\overset{\overset{NH_2}{|}}{CH_2OHCCH_2OH}}$$

may be used as chelating or complexing agents for the silver solution. All of these five compounds serve excellently and are fully satisfactory. Minor differences only are found between them when they are used with hydrazine sulphate or paraformaldehyde, in the presence, if desired, of sodium carbonate.

*Example 5*

The following sensitized solutions are also excellent:

| | "A"—Grams | "B"—Grams | "C"—Grams |
|---|---|---|---|
| Water | 1 Gal. | 1 Gal. | 1 Gal. |
| Tin chloride | 20 | 20 | 15 |
| Betaine hydrochloride | | 20 | |
| Glutamic acid hydrochloride | | | 15 |
| Sulfamic acid | 15 | | |

The least expensive of these mixtures is "A." The best results are had with "C."

*Example 6*

The following mixture is also excellent as the reducer:

| | |
|---|---|
| "EDTA" (ethylene diamine tetraacetic acid, Versene Chemical Div., Dow) | grams__ 213 |
| Hydrazine sulphate | do____ 28 |
| Water | gallons__ 1 |

*Example 7*

Typical compounds using Tris (hydroxymethyl) amino methane are:

| | "A"—Grams | "B"—Grams | "C"—Grams |
|---|---|---|---|
| Water | 1 Gal. | 1 Gal. | 1 Gal. |
| "Tris" | 95 | 95 | 151 |
| Hydrazine sulphate | 14 | 14 | 28 |
| "Amp" (mixed amino acids) | | 9½ | |
| Sodium carbonate | | | 30 |

"A"—this compound was formulated to make possible a small kit unit.

"B"—this compound reacted fast because "Amp" increased the pH considerably of the solution.

"C"—this compound was less expensive than "B" because sodium carbonate was used instead of compound Amp. This is a fast reacting mixture.

Thus the composition and procedure of the invention provides a new type of silvering mixture in which all of the components are dry solids suitable for convenient mixing and storage; in which a new sensitizing agent is provided which avoids the necessity for liquid hydrochloric acid; and a new silvering solution in which the silver is sequestered or chelated or complexed to permit the use of the reducing agents than have previously been found useful. By this procedure and combination of substances, it becomes possible to obtain a much denser, much thicker, much more satisfactory, silver layer upon a much greater range of base substances.

While there are above disclosed but a limited number of embodiments of the process and composition of the invention, it is possible to provide still other embodiments without departing from the inventive concept herein

The invention claimed is:

1. An ammonia free process for silvering a non-metallic surface from an aqueous solution, consisting of sensitizing the surface to be silvered with an aqueous solution comprising stannic chloride and a normally solid, water-soluble acidic organic body and then applying an aqueous solution comprising soluble silver salt, a chelating agent selected from the group consisting of 2-amino-1-butanol, 2-amino-2-methyl-1-propanol, 2-amino-2-methyl-1,3 propanediol, 2-amino-2-ethyl-1,3 propanediol, tris-(hydroxymethyl) aminomethane, amino acids, and ethylenediaminetetra-acetic acid, and silver reducing agent.

2. The process of claim 1 wherein the acidic organic body is a member of the group consisting of sulfamic acid, betaine hydrochloride, and glutamic acid hydrochloride.

3. The process of claim 1 wherein the reducing agent is a soluble hydrazine salt.

4. The process of claim 1 wherein the soluble silver salt is silver nitrate.

5. The process of claim 1 wherein the chelating agent consists of a mixture of 2-amino-2-methyl-1-propanol and tris-(hydroxymethyl) aminomethane.

6. An ammonia-free process for silvering a previously sensitized non-metallic surface comprising applying an aqueous solution comprising water-soluble silver salt, a chelating agent selected from the group consisting of 2-amino-1-butanol, 2-amino-2-methyl-1-propanol, 2-amino-2-methyl-1,3 propanediol, 2-amino-2-ethyl 1,3 propanediol, tris-(hydroxymethyl) aminomethane, amino acids, and ethylenediaminetetra-acetic acid, and silver reducing agent.

7. The process of claim 6 wherein the reducing agent is a soluble hydrazine salt.

8. The process of claim 6 wherein the water-soluble silver salt is silver nitrate.

9. The process of claim 6 wherein the chelating agent consists of a mixture of 2-amino-2-methyl-1-propanol and tris-(hydroxymethyl) amino-methane.

References Cited in the file of this patent

UNITED STATES PATENTS

| | | |
|---|---|---|
| 2,303,871 | Walker | Dec. 1, 1942 |
| 2,363,354 | Peacock | Nov. 21, 1944 |
| 2,602,757 | Kantrowitz et al. | July 8, 1952 |

FOREIGN PATENTS

| | | |
|---|---|---|
| 158,460 | Great Britain | Feb. 10, 1921 |

OTHER REFERENCES

Narcus: "The Role of Chelating Agents in the Plating Industry," Metal Finishing, March 1952, pp. 54–62, vol. 50, No. 3.

Newton: "Metallizing Non-Conductors," Samuel Wein, 1945, Metal Industry Publishing Co., N. Y. C., page 33.